(12) United States Patent
Mendez et al.

(10) Patent No.: US 9,145,996 B2
(45) Date of Patent: Sep. 29, 2015

(54) LOWER EXTREMITY DRYER

(71) Applicants: Joseph Alexander Mendez, Cibolo, TX (US); Patsy Ruiz-Mendez, Cibolo, TX (US); Joshua Bryn Mendez, Cibolo, TX (US); Ryan Joseph Mendez, Cibolo, TX (US)

(72) Inventors: Joseph Alexander Mendez, Cibolo, TX (US); Patsy Ruiz-Mendez, Cibolo, TX (US); Joshua Bryn Mendez, Cibolo, TX (US); Ryan Joseph Mendez, Cibolo, TX (US)

( * ) Notice: Subject to any disclaimer, the term of this patent is extended or adjusted under 35 U.S.C. 154(b) by 86 days.

(21) Appl. No.: 13/965,873

(22) Filed: Aug. 13, 2013

(65) Prior Publication Data

US 2015/0047723 A1 Feb. 19, 2015

(51) Int. Cl.
*F16L 41/02* (2006.01)
*F16L 47/06* (2006.01)

(52) U.S. Cl.
CPC ............. *F16L 41/02* (2013.01); *F16L 47/06* (2013.01); *Y10T 137/85938* (2015.04)

(58) Field of Classification Search
CPC ...... F26B 21/00; F26B 21/004; F26B 21/006; F26B 25/00
USPC ............. 34/90, 104, 120, 121; 454/155; 137/561 A, 872, 874, 876
See application file for complete search history.

(56) References Cited

U.S. PATENT DOCUMENTS

| | | | | |
|---|---|---|---|---|
| 3,139,480 A | * | 6/1964 | Desloge | 174/660 |
| 3,645,009 A | * | 2/1972 | Ketchum | 34/104 |
| 4,094,076 A | * | 6/1978 | Baslow | 34/90 |
| 4,136,464 A | * | 1/1979 | Hay | 34/104 |
| 4,782,601 A | | 11/1988 | Gonzalez | |
| 5,003,707 A | | 4/1991 | Chu | |
| 5,098,568 A | * | 3/1992 | Tyson | 210/519 |
| 5,222,308 A | * | 6/1993 | Barker et al. | 34/104 |
| 5,289,642 A | * | 3/1994 | Sloan | 34/104 |
| 5,406,717 A | * | 4/1995 | Dofka | 34/104 |
| 5,606,640 A | * | 2/1997 | Murphy | 392/382 |
| 5,675,907 A | | 10/1997 | Reppas et al. | |
| 5,904,090 A | * | 5/1999 | Lillelund et al. | 99/495 |
| 5,907,134 A | * | 5/1999 | Nording et al. | 181/228 |
| D433,204 S | * | 10/2000 | Gardner, Jr. | D32/58 |
| 6,189,231 B1 | | 2/2001 | Lancer | |
| 6,270,401 B1 | * | 8/2001 | Wormmeester | 454/290 |
| 6,796,053 B2 | * | 9/2004 | Lurie | 34/104 |
| 7,258,286 B1 | * | 8/2007 | Wang et al. | 239/562 |
| 7,909,266 B2 | * | 3/2011 | Lo | 239/242 |
| 8,393,482 B2 | * | 3/2013 | Durham | 211/85.7 |
| 2004/0068888 A1 | * | 4/2004 | Lurie | 34/90 |
| 2005/0204579 A1 | * | 9/2005 | Rosseau et al. | 34/104 |
| 2006/0186073 A1 | | 8/2006 | Roe et al. | |
| 2007/0111653 A1 | * | 5/2007 | Endou | 454/155 |
| 2007/0181204 A1 | * | 8/2007 | Stout | 138/149 |
| 2007/0235100 A1 | * | 10/2007 | Tomerlin et al. | 138/112 |
| 2007/0235568 A1 | * | 10/2007 | Wang et al. | 239/562 |
| 2008/0054103 A1 | * | 3/2008 | Nies | 239/562 |
| 2009/0308950 A1 | * | 12/2009 | Lo | 239/242 |
| 2013/0213978 A1 | * | 8/2013 | Libourel et al. | 220/592.27 |

* cited by examiner

*Primary Examiner* — Craig Schneider
*Assistant Examiner* — Daniel P Donegan
(74) *Attorney, Agent, or Firm* — Gunn, Lee & Cave, PC (57) ABSTRACT

A lower extremity dryer which allows a person to dry his/her lower extremities without having to bend over is disclosed. The lower extremity dryer has a conduit with an interior which extends from first portion an elevated position to a second portion which lies along a bathroom floor or along some other surface. The second portion has a plurality of outlets allowing air flow from the interior of the conduit to travel out of the conduit. The travel of airflow out of the conduit dries a person's lower extremities. A displaceable cover on the second portion allows a user to select the side of the lower extremity dryer from which the air flows.

16 Claims, 5 Drawing Sheets

LOWER EXTREMITY DRYER

CROSS REFERENCES TO RELATED APPLICATIONS

None.

STATEMENT REGARDING FEDERALLY SPONSORED RESEARCH OR DEVELOPMENT

Not applicable.

BACKGROUND OF THE INVENTION

1. Technical Field

The present invention generally concerns the field of personal hygiene and proper drying of a person's lower extremities. Specifically, it concerns a lower extremity dryer which redirects airflow of a conventional hair dryer from an elevated position to a lower position and toward a user's lower extremities, thereby alleviating the need for bending over and towel drying these hard-to-reach areas.

2. Description of the Related Art

Good personal hygiene practices are a necessary component of maintaining one's health. Included within good hygiene practices is a need to properly dry one's lower extremities, especially areas of the foot and, in particular, in between one's toes. Failure to properly dry these areas may result in the development of fungal infections such as tinea pedis—commonly known as "Athlete's Foot—or other related infections.

Properly drying lower extremities can be challenging. Individuals with limited range of movement for example, older persons, those with disabilities, or simply those who are not flexible may have trouble bending over to towel dry their lower extremities. As alternative, such a person may lift his or her lower extremity closer toward his or her torso but doing so requires balance and still may not be possible for those with limited range of movement. Although, lower extremity dryers exists, many require the user to bend over to operate them or contain complicated components to enable operation without bending over. Thus, there is a need for a lower extremity dryer which does not require bending over during operation.

BRIEF SUMMARY OF THE INVENTION

The present invention is directed to lower extremity drying apparatus which redirects air from a conventional hair dryer toward the lower extremities of a user. The invention includes a conduit comprised of a first portion connected through a bend to a second portion. The second portion lies generally parallel to the ground or other surface while the first portion extends away from the ground or other surface. The first portion is preferably double-walled and terminates at a first end with an opening into an interior of the conduit. The opening at the first end is elevated with respect to the second portion. Preferably, a receptacle is attached to the conduit at the opening to receive and seal entry of the conventional hair dryer.

The conduit has an interior which extends between the first and second portions. The interior may be defined by differing interior surfaces of the first portion, the bend, and the second portion or may be defined by a single continuous interior surface extending between these elements. A plurality of outlets extends between the interior surface of the second portion and an exterior surface of the second portion. The plurality of outlets is disposed along the second portion in one or more groups of linear arrangements. Preferably, there is at least one linear arrangements of outlets on one side of the second portion and at least one linear arrangements on a second side of the second portion, with the two sides being opposite each other.

A cover which is displaceable over the outlets is attached to the second portion of the conduit. Preferably, the exterior surface of the second portion is arced and is nested within a corresponding arced surface of the cover. A stud extending from the arced exterior surface of the second portion extends through a slot in the cover and attaches the cover to the second portion. In this regard, a retaining member on the stud prevents the cover from being displaced away from the second portion but still allows for displacement of the cover along the second portion.

In use, air from the conventional hair dryer flows from the opening in the first end of the conduit through the interior of the conduit. At the second portion, the air travels unrestricted through outlets unless the cover is positioned over the outlets to conceal them. In the preferred embodiment, the cover displaces in an arced path along an arced on the arced exterior surface of the second portion and restricts airflow from outlets on the first side or from outlets on the second side, thereby allowing the user to select the side of the second portion from which air flows.

DETAILED DESCRIPTION OF THE INVENTION

Figure 1:
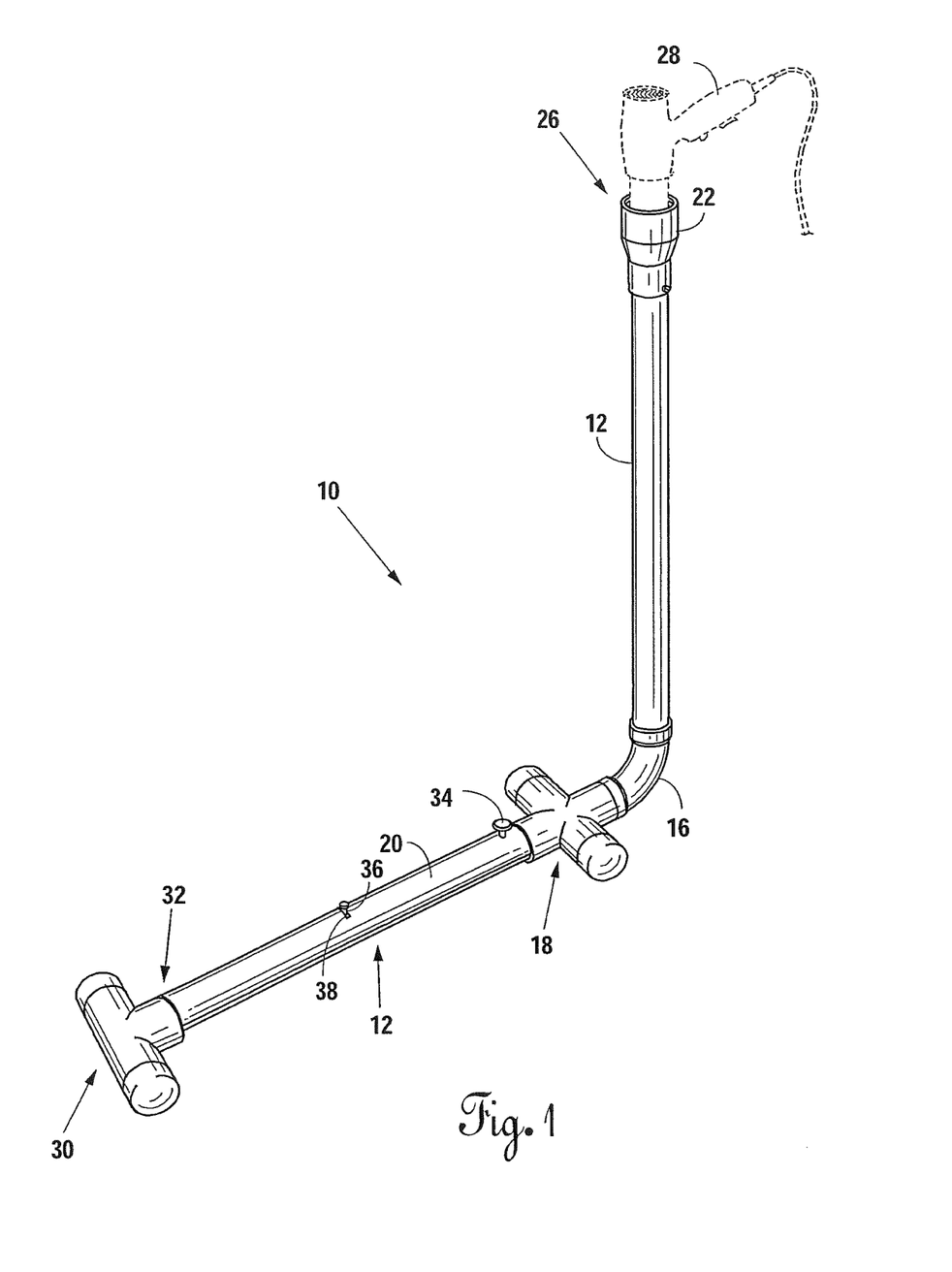
FIG. 1 illustrates a top perspective view of the preferred embodiment of the present invention with a conventional hair dryer inserted into a receptacle at an opening at a first end of a conduit.

Referring to FIG. 1, a conduit 10 is shown formed by a first portion 12 connected to a second portion 14 through a bend 16. A first support 18 is attached to the second portion 14 of the conduit 10 between the bend 16 and a cover 20. The cover 20 is also attached to the second portion 14. The first support 18 helps stabilize the conduit 10 when it is placed on a surface (not shown) to maintain the first portion 12 in an upright position, allowing a receptacle 22 on a first end 26 of the conduit 10 to be elevated with respect to the second portion 14 of the conduit 10. As shown, a conventional hair dryer 28 may be inserted into the receptacle 22 and directed into the conduit 10.

A second support 30 is attached at a second end 32 of the conduit 10. Like the first support 18, the second support 30 preferably is attached to the second portion 14 of the conduit 10; however, either or both supports 18, 30 may be attached to the conduit 10 elsewhere. For example, a single support (not shown) may extend from the first portion 12 toward the J ground (not shown). The second support 30 also helps stabilize the conduit 10 to maintain the first portion 12 in an upright position. In this regard, the preferred conduit 10 is a generally tubular structure and the first and second supports 18, 30 prevent the first portion 18 of the conduit 10 from rolling out of its upright position. It should be noted, however, that the second portion 14 of the conduit 10 may not be tubular and may be shaped such that the first and/or second supports 18, 30 are not necessary.

A knob 34 is shown attached to the cover 20 in FIG. 1. Preferably, the knob 34 is attached to the cover 20 near the bend 16 but could be located elsewhere on the cover 20. As will be seen, the knob 34 may be pushed or pulled to displace the cover 20 relative to the second portion 14 of the conduit 10. In this regard, the cover 20 is attached to the second portion 14 with a stud 36 extending from the second portion 14 through a slot 38 in the cover 20. Depending on the embodiment, additional slots with studs therein may be present.

Figure 2:
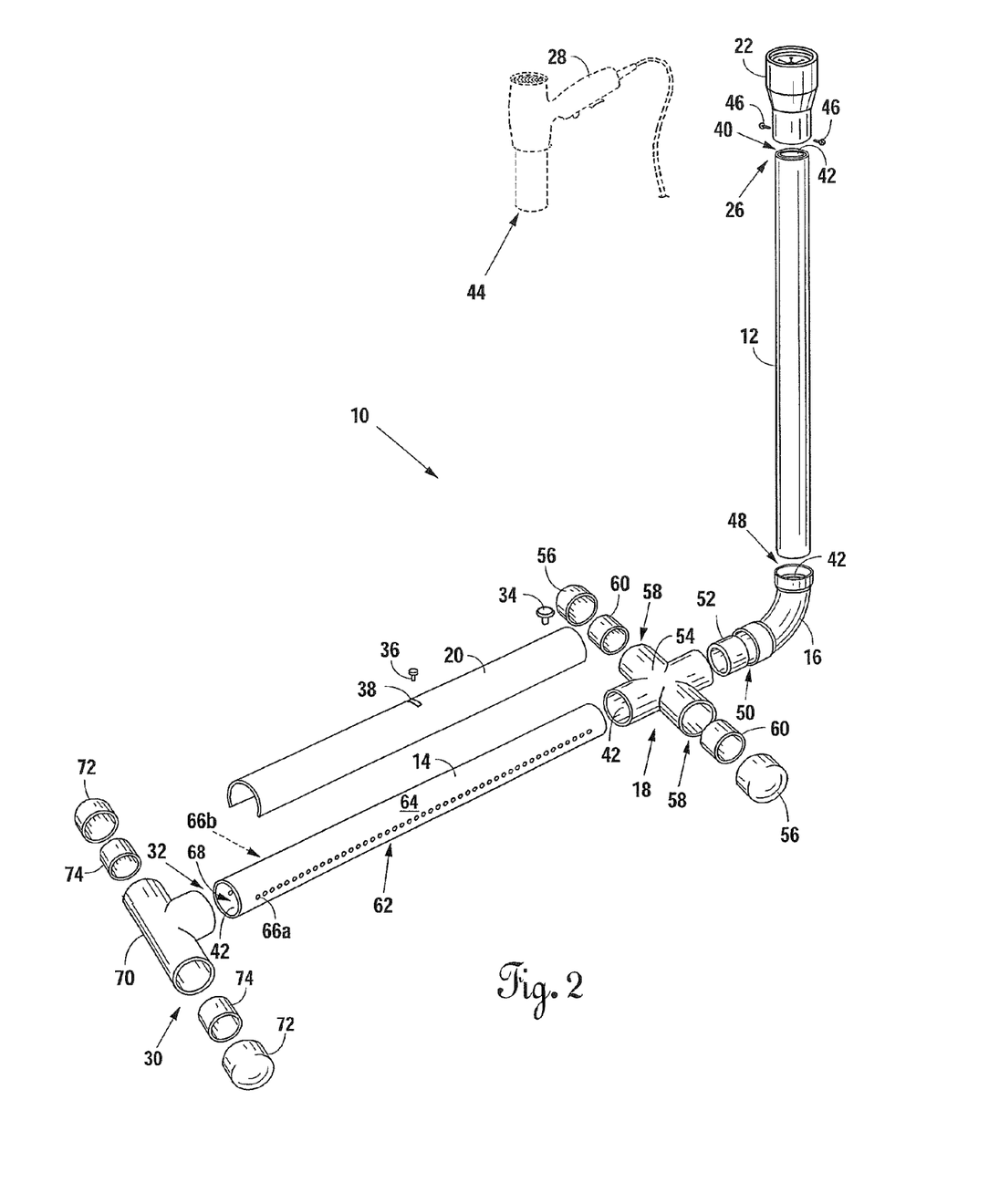
FIG. 2 is an exploded perspective of the preferred embodiment of the present invention with the conventional hair dryer removed from the receptacle.

FIG. 2 shows the component parts of the preferred lower extremity dryer in an exploded view. At the first end 26, the receptacle 22 has been removed from the first portion 12, revealing an opening 40 into an interior 42 of the conduit 10. Preferably, the opening 40 is at least as large as an output end 44 of the hair dryer 28 and is located at the first end 26 of the conduit 10 as shown. However, it could be slightly larger or slightly smaller than the output end 44 of the hair dryer 28 or may be located elsewhere on the first portion 12 of the conduit 10 with the first end 26 closed such as, for example, if the opening 40 were part of a Wye-type fitting (not shown) installed on the first portion 12 of the conduit 10.

The receptacle 22 may be any component which receives the output end 44 of the hair dryer 28 and aligns it with the opening 40. Preferably, the receptacle 22 creates a seal against the output end 44 so that airflow from the hair dryer 28 flows through the receptacle 22 and proceeds into the opening 40 with minimal loss. The receptacle 22 is placed over the opening 40 at the first end 26 of the conduit 10 and is secured to the first end 26 with one or more fasteners 46. If, however, the opening 40 were located elsewhere as mentioned above, the receptacle 22 would be placed over the opening 40 and secured to the first portion 12 of the conduit 10 at such alternative location.

The first portion 12 of the conduit 10 inserts into a first end 48 of the bend 16 to connect the first portion 12 thereto. The interior 42 of the conduit 10 continues through the bend 16 into a second end 50 of the bend 16 and toward the second portion 14 of the conduit 10. At the second end 50 of the bend 16, a spacer 52 inserted into the first support 18 and the bend 16 connects those two items. The interior 42 of the conduit 10 continues through the spacer 52 and into the first support 18. In the preferred embodiment, the first support 18 is a cross connector 54 with endcaps 56 connected to opposing ends 58 of the connector 54 via spacers 60 inserted into the endcaps 56 and the connector 54. When conduit 10 and first support 18 are assembled, the part of the connector 54 extending between the endcaps 56 gives the conduit stability, as previously noted.

The second portion 14 of the conduit 10 inserts into the cross connector 54 to connect the second portion 14 thereto and, when assembled, the part of the cross connector 54 extending from the second end 50 of the bend 16 to the second portion 14 is the pathway of the interior 42 of the conduit 10 to the second portion 14. It should be noted, however, that in alternative embodiments the second portion 14 may insert directly into the second end 50 of the bend 16 with the first support 18 attached to the second portion 14 in some other manner.

The second portion 14 of the conduit 10 has a plurality of outlets 62 disposed along an exterior surface 64 of it. Preferably, the outlets are grouped in a first linear arrangement 66a along one side of the exterior surface 64 of the second portion 14 as shown in FIG. 2 and in a second linear arrangement 66b along an opposite side of the exterior surface 64 of the second portion 14. Although the linear arrangement on the opposite side of the second portion 14 cannot be seen in FIG. 2, one of the outlets 62 within that linear arrangement can be seen on an interior surface 68 within the second portion 14. The stud 36 is shown removed from the exterior surface portion 14 with the cover 20 shown between the stud 36 and the second portion 14 is shown. Additionally, the knob 34 is removed from the cover 20.

The second support 30 is also shown exploded and detached from the second portion 14 in FIG. 2. Preferably, the second support 30 is formed by a Tee connector 70 with endcaps 72 at opposite ends. When assembled, the endcaps 72 and the opposite ends of the Tee connector 70 have spacers 74 inserted therein to connect those items to each other and the part of the Tee connector 70 extending between the endcaps 72 provides stability as previously noted. Additionally, when assembled the second portion 14 of the conduit 10 is inserted into the end of Tee connector 70 which does not have endcaps 72 in order to connect the second portion 14 thereto. Thus, in this embodiment the Tee connector 70 terminates the conduit 10 as its second end 32. It should be noted, however, that in alternative embodiments the second support 30 may be configured differently and/or may be attached to the second portion 14 in some other manner. Additionally, the conduit 10 may not terminate at its second end 32 in further alternative embodiments such as, for example, if the conduit 10 had another portion (not shown) which extended vertically from the second end 32, similar to the manner in which the first portion 12 extends vertically from the bend 16.

Figures 3, 4:
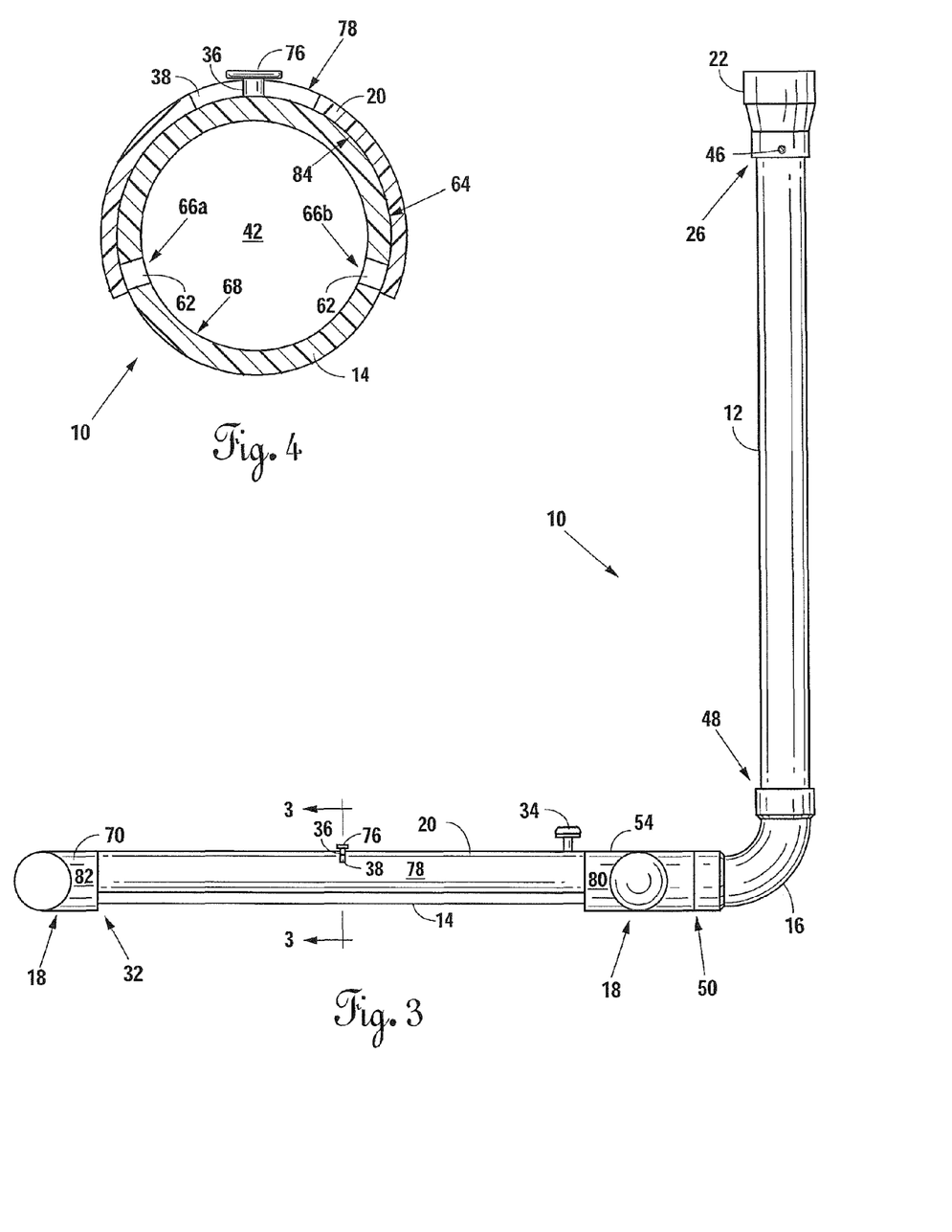
FIG. 3 shows a side elevation view of the preferred embodiment of the present invention with a cover concealing a plurality of outlets.
FIG. 4 shows a cross-sectional side view taken along section line 3-3 in FIG. 2.

FIG. 3 shows the lower extremity dryer assembled and from a side view. The receptacle 22 is connected at the first end 26 of the conduit 10 with fasteners 46 securing the receptacle 22 to the first portion 12. The first portion 12 is inserted into the first end 48 of the bend 16 to connect it thereto. The first support 18 is connected to the second end 50 of the bend 16 with the spacer 52 (not shown) inserted into the second end 50 and into the cross connector 54. This first support 18 is connected to the second portion 14 and is thereby attached thereto. In this regard, part of the second portion 18 is inserted into the cross connection 54 opposite of the bend 16. The second portion 14 is also connected to the second support 30 by being inserted into the Tee connector 70 at the second end 32 of the conduit 10.

The cover 20 is attached to the second portion 14 of the conduit 10 with the stud 36 extending through the slot 38 in the cover 20. A retaining member 76 is on the stud 36 just above an exterior surface 78 of the cover 20. The retaining member 76 may be in the form of a head on the stud 36 as shown or in some other form which prevents the cover 20 from being displaced away from its attachment to the second portion 14 of the conduit 10. Additionally, it should be noted that the stud 36 and the retaining member 76 may be integrally formed as a single component from the same material such as, for example, a screw with a head thereon (not shown), or, may be formed from separate pieces attached to each other.

The knob 34 is also shown extending from the exterior surface 78 of the cover 20. The knob may be attached to the cover 20 in a number of ways. In the preferred embodiment, for example, the knob 34 is threaded onto a fastener (not shown) extending through the cover 20. Additionally, the exterior surface 78 of the cover 20 is shown aligned with an exterior surface 80 of the first support 18 and an exterior surface 82 of the second support 30 in FIG. 3. It should be noted, however, that such alignment may not be present depending on the shape and configuration of the cover 20, the first and second supports 18, 30, and/or the second portion 14 of the conduit 10.

FIG. 4 shows the cover 20, the slot 38, and the second portion 14 of the conduit 10 from a cross-sectional side view along section line 3-3 in FIG. 3, with the stud 36 and the retaining member 76 in a side plan view. Preferably, the retaining member 76 is positioned on the stud 36 so that it contacts the exterior surface 78 of the cover 20 and maintains the cover 20 against the exterior surface 64 of the second portion 14. In this regard, the exterior surface 64 of the second portion 14 arced and is nested within and immediately adjacent to an interior surface 84 of the cover 20 which is arced. It should be noted, however, that the interior surface 84 of the cover 20 may be located further from the exterior surface 64 of the second portion 14 if the location of the retaining member 76 on the stud 36 were further from the exterior surface 64 of the second portion 14.

The interior 42 of the conduit 10 defined by the interior surface 68 within the second portion 14 is also shown in FIG. 4. The plurality of outlets 62 extends from the interior surface 68 of the second portion 14 to its exterior surface 64, allowing air or other fluids in the interior 42 of the conduit 10 to travel out of the outlets 62 in the disposed along the second portion 14. The first linear arrangement 66a of outlets 62 and the second linear arrangement 66b of outlets 62 are shown on opposite sides of the second portion 14 so that the second portion 14 is bilaterally symmetric about a plane of symmetry (not shown) extending along its length. The cover 20 is in a position which conceals the outlets 62 and restricts air flow from the interior 42. In this regard, the slot 38 in the cover 20 is arced and the cover 20 is positioned so that the stud 34 is at the midpoint of the arc.

Figure 5:
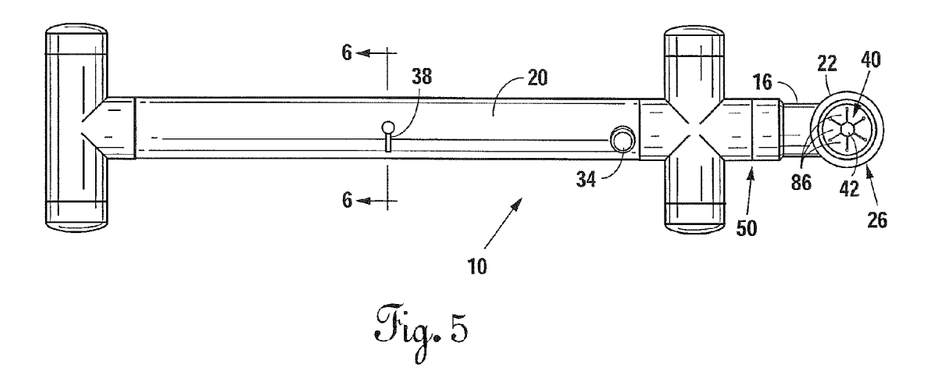
FIG. 5 shows a top plan view of the preferred embodiment of the present invention with the cover displaced toward one side of the second portion.
Figure 6:
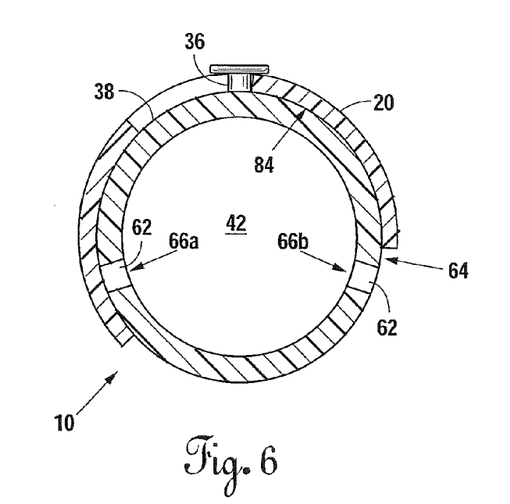
FIG. 6 is a cross-sectional side view taken along section line 5-5 in FIG. 4, with the cover displaced to reveal outlets along one side of the second portion.

FIGS. 5 and 6 show the cover 20 has been displaced from its position in FIGS. 3 and 4 so that the second linear arrangement 66b of outlets 62 is no longer concealed. In the embodiment shown, the knob 34 has been pushed or pulled so that the interior surface 84 of the cover 20 is rotated about the exterior surface 64 of the second portion 14, leaving the stud 36 at one end of the arced slot 38. In this position, the second linear arrangement 66b of outlets 62 is not concealed and airflow or other fluid communication from the interior 42 of the conduit 10 through the second linear arrangement 66b is not restricted. Meanwhile, however, the first linear arrangement 66a of outlets 62 remains concealed and airflow or fluid communication from the interior 42 of the conduit 10 is restricted with respect to those outlets 62.

It should be noted that the slot 38 may be configured differently in alternative embodiments and, therefore, the cover 20 may be displaced in a different manner to allow for unrestricted airflow from the plurality of outlets 62. For example, the slot 38 may extend as a straight line along the length of the second portion 14 so that the cover 20 is displaceable toward and away from the second end 50 of the bend 16 (not shown). Additionally, the plurality of outlets 62 may be arranged according to the displacement path of the cover 20 and with a longitudinal slot 38, for example, the outlets 62 may be located on only a single side of the second portion 20 rather than on opposite sides.

FIG. 5 also shows the opening 40 into the interior 42 of the conduit 10 through the receptacle 22 attached at the first end 26 thereof. The receptacle 22 has one or more sealing members 86 extending over the opening 40. The sealing members 86 are made from a resilient material, such as an elastomer, which presses against the output end 44 of the air dryer 28 when it is inserted into the receptacle 22. After the output end 44 has been withdrawn, the resiliency of the sealing members 86 causes them to displace back into the position shown in FIG. 5. In the preferred embodiment, the receptacle 22 is foamed using a Plumb-Pak® three inch (3") diameter fixed post garbage disposal splash guard (Model No. PP22012) mounted within a 3"×2" Flexible Coupling offered by American Valve® under Model No. RC 75X50, with the bands around the flexible coupling removed. Both of these items are made from an elastomeric material and the splash guard may be sewn or affixed in some other way to the inner circumference of the three inch (3") end of the flexible coupling.

Figure 7:
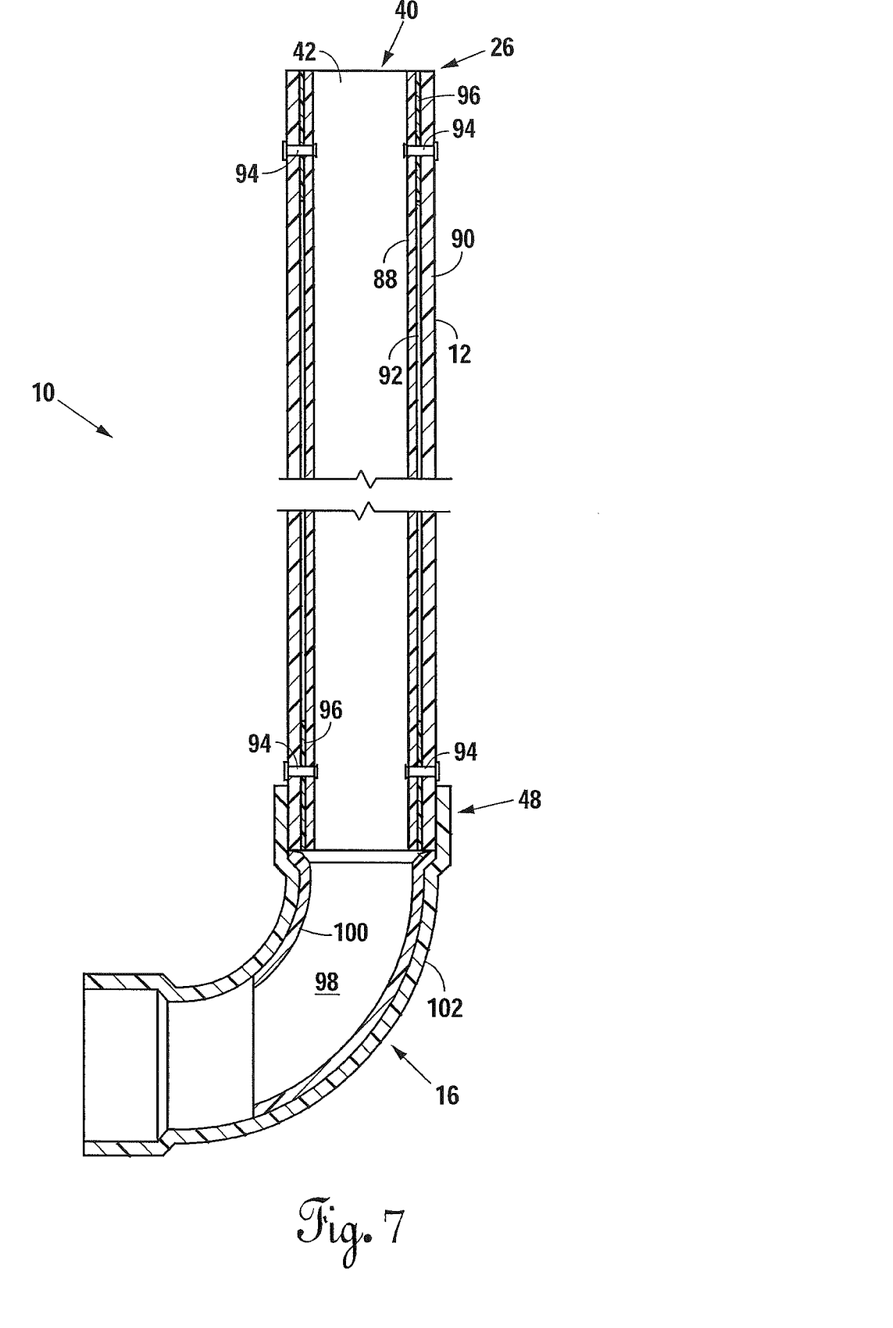
FIG. 7 is a partial cross-sectional side view of the preferred embodiment of the present invention showing a first portion and a bend of the conduit.

FIG. 7 is a partial cross-section side view which illustrates the double-wall construction of the first portion 12 and the bend 16 of the conduit 10 previously noted. The receptacle 22 has been removed from the first end 26 of the conduit 10, revealing the opening 40 into the interior 42 of the conduit 10 within the first portion 12. Defining the interior 42 of the conduit 10 in the first portion 12 is an inner sidewall 88. The inner sidewall 88 is positioned within an outer sidewall 90 with a cavity 92 between the two sidewalls 88, 90. The position of the inner sidewall 88 within the outer sidewall 90 is maintained by one or more rivets 94 extending between the sidewalls 88, 90 through intermediate members 96. The intermediate members 96 preferably extend far enough around the inner sidewall 88 to ensure that a uniform distance is maintained between the first and second sidewalls 88, 90 throughout the cavity 92.

At the first end 48 of the bend 16, the first and second sidewalls 88, 90, as well as the intermediate member 96 near the first end 48 of the bend 16, terminate into an internal member 98 inserted into the bend 16 from its first end 48. The internal member 98 creates an inner wall 100 within part of the bend 16 next to an outer wall 102 of the bend 16, thereby creating a double-wall construction through part of the bend 16.

The double-wall construction within the first portion 12 of the conduit 10 and in part of the bend 16 of the conduit 10, prevents these elements from becoming too hot. In this regard, air from the hair dryer 28 may heat the inner sidewall 88 of the first portion 12 and the inner wall 100 of the bend 16; however, the outer sidewall 90 of the first portion 12 and the outer wall 102 of the bend 16 will remain cool to the touch.

With the first portion 12 in an upright position and the receptacle 22 elevated with respect to the plurality of outlets 62 along the second portion 14, a user can insert the hair dryer 28 into the receptacle 22 without having to bend over. To achieve this result, the first portion 12 of the conduit 10 extends from the bend 16 a sufficient length for the user to reach the receptacle 22 with limited or no bending at the knees. In the preferred embodiment, the first portion 12 of the conduit 10 is longer than the second portion 14 of the conduit 10. It is anticipated, however, that the first portion 12 may be shorter than the second portion 14 if the second portion 14 extends a significant distance from the bend 16.

Preferably, when the first portion 12 is upright the overall height of the conduit 10 and the receptacle 22 is thirty-two to thirty-five inches (32"-35") high, while the length of the second portion 14 of the conduit 10 is twenty-four to twenty-six inches (24"-26") long. Additionally, the outer sidewall 90 of the first portion 12 and the second portion 14 of the conduit 10, as well as the spacers 60, 74, are preferably constructed of a two inch (2") nominal size, schedule 40 polyvinyl chloride (PVC) pipe conforming to ASTM standards D1785 and F480. The bend 16, the cross connector 54 and its endcaps 56, as well as the Tee connector 70 and its endcaps 72, are sized so that corresponding part from either the first portion 12, the second portion 14, or the spacers 60, 74, creates an interference fit therein.

For the double-wall construction in the first portion 12, a one-and-one-half inch (1.5") PVC pipe is inserted within the outer sidewall 90 of the first portion 12 to form the inner sidewall 88 therein. Plastic hanger strap is then inserted into the cavity 92 between the inner and outer sidewalls 88, 90 and fixed into place with one or more rivets 94. The internal member 98 which forms the double-wall construction in the bend 16 is also formed using one-and-one-half inch (1.5") PVC pipe. In this regard, a one-and-one-half inch (1.5") ninety degree (90°) elbow (not shown) is used. Approximately one-and-one-half inches (1.5") of the pipe are removed from both ends of the elbow and the remaining portion is heated to render it pliable. When pliable, the remaining portion is formed into the internal member 98 which fits into the bend 16, thereby forming the inner and outer walls 100, 102 of the bend 16.

The cover 20 is also heated and rendered pliable to form it. First a two inch (2") nominal size PVC pipe (not shown) is cut to a length of about two inches (2") less than the length of the second portion 14. Then, about one fourth of the two inch (2") is removed lengthwise along the pipe, leaving a "C"-shaped pipe remaining. The "C"-shaped pipe is then heated and, once rendered pliable, it is widened to fit on the exterior surface 64 of the second portion 14. The slot 38 is cut therein and the knob 34 is added thereto. The cover 20 is then placed on the exterior surface 64 of the second portion 14.

On the second portion 14, the preferred shape and size of each of the outlets 62 in the linear arrangements 66a, 66b is a 11/32" to 3/8" diameter circle, with one-half inch (½") between outlets 62 (as measured from centers of the outlets 62) and forty-seven (47) outlets 6 in each of the linear arrangements 66a, 66b. This number and size or outlets 62 has been shown to prevent the hair dryer 26 from becoming overheated and shutting off. The outlets 62 are preferably drilled into the second portion 14 prior to the cover 20 being installed.

With the above-described preferred dimensions, the preferred lower extremity dryer of the present invention fits within a standard bathroom. In this regard, the preferred embodiment is about as high as a standard bathroom countertop and the second portion 14 of the conduit 10 and the cover 20 attached thereto may be positioned at least partially within the space of a standard toe kick plate for bathroom cabinets (not shown). Additionally, the bathroom cabinets may be installed with the lower extremity dryer integrated therein. For example, the receptacle 22 may extend from a hole in a bathroom countertop (not shown) with the conduit 10 extending from the hole an along the toe kick plate (not shown).

It should also be noted that the conduit 10 does not necessarily have to be tubular in shape with a circular cross section interior 54. In fact, it is anticipated that the conduit 10 may be shaped differently in alternative embodiments. For example, the conduit 10 may be in the form of a prism with a polygonal cross section interior (not shown). If such were the case, part of the exterior surface 64 of the second portion 14 may still be arced and nested within the interior surface 84 of the cover 20. In yet even a further alternative, the interior surface 84 of the cover 20 may be shaped to correspond with a differently shaped exterior surface 64 of the second portion 14, perhaps displacing longitudinally along the exterior surface 64 rather than rotating about it. Finally, it should be noted that the first portion 12 and second portions 14 of the conduit 10 may not be shaped similar to each other in further alternative embodiments provided, however, that the interior 42 of the conduit 10 extends through them.

Although the present invention has been described with reference to specific embodiments, this description is not meant to be construed in a limiting sense. Various modifications of the disclosed embodiments, as well as alternative embodiments of the invention will become apparent to persons skilled in the art upon the reference to the above description of the invention. It is, therefore, contemplated that the appended claims will cover such modifications that fall within the scope of the invention.

The invention claimed is:

1. A lower extremity dryer comprising:
 a conduit having interior extending between a first end and a second end of said conduit;
 a bend in said conduit between said first end and said second end;
 a plurality of outlets disposed along an exterior surface on said conduit between said bend and said second end, said outlets extending from an interior surface of said conduit to said exterior surface on said conduit;
 a cover attached to said conduit between said bend and said second end, said cover being displaceable with respect to said conduit over at least one of said outlets;
 a slot disposed within said cover and a stud extending from said exterior surface on said conduit through said slot;
 a retaining member on said stud, wherein at least a portion of said cover is between said retaining member and said exterior surface on said conduit; and,
 an opening into the interior of said conduit between said bend and said first end of said conduit.

2. The lower extremity dryer of claim 1 wherein said opening is at the first end of said conduit.

3. The lower extremity dryer of claim 1 wherein at least part of said exterior surface on said conduit is arced and is nested within an arced surface of said cover.

4. The lower extremity dryer of claim 3 wherein the slot disposed within said cover is arced.

5. The lower extremity dryer of claim 3 wherein the slot disposed within said cover is linear.

6. The lower extremity dryer of claim 1 wherein at least some of said plurality of outlets are grouped in at least one linear arrangement.

7. The lower extremity dryer of claim 6 wherein a first linear arrangement of outlets is grouped at least partly along on a first side of said conduit and a second linear arrangement of outlets is grouped at least partly along on a second side of said conduit.

8. The lower extremity dryer of claim 7 wherein said first side of said conduit is opposite said second side of said conduit.

9. The lower extremity dryer of claim 1 comprising at least one support extending from said conduit between the second end of said conduit and the bend in said conduit.

10. A lower extremity dryer comprising:
 a conduit having a first portion connected to a second portion and an interior extending between said first and second portions;
 a plurality of outlets disposed along the second portion of said conduit, said outlets extending from an interior surface within said second portion to an exterior surface on the second portion;

a cover attached to the second portion of said conduct, said cover being displaceable between a first position where said cover conceals at least one of said outlets to a second position where at least one of said outlets concealed in the first position of said cover is no longer concealed;

a slot disposed within said cover and a stud with a retaining member thereon extending from said exterior surface through said slot; and, an opening in the first portion of said conduit into the interior of said conduit.

11. The lower extremity dryer of claim 10 wherein said opening is at an end of said conduit.

12. The lower extremity dryer of claim 10 wherein at least part said exterior surface on the second portion of said conduit is arced and is nested within an arced surface of said cover.

13. The lower extremity dryer of claim 12 wherein the slot disposed within said cover is arced.

14. The lower extremity dryer of claim 10 wherein the first portion is connected to the second portion through a bend.

15. The lower extremity dryer of claim 10 wherein said first portion of said conduit is double walled.

16. The lower extremity dryer of claim 10 comprising at least one support extending from the second portion of said conduit.

* * * * *